Sept. 27, 1938. R. F. BRACKE 2,131,036
FUEL FEEDING SYSTEM
Filed March 21, 1935 3 Sheets-Sheet 1
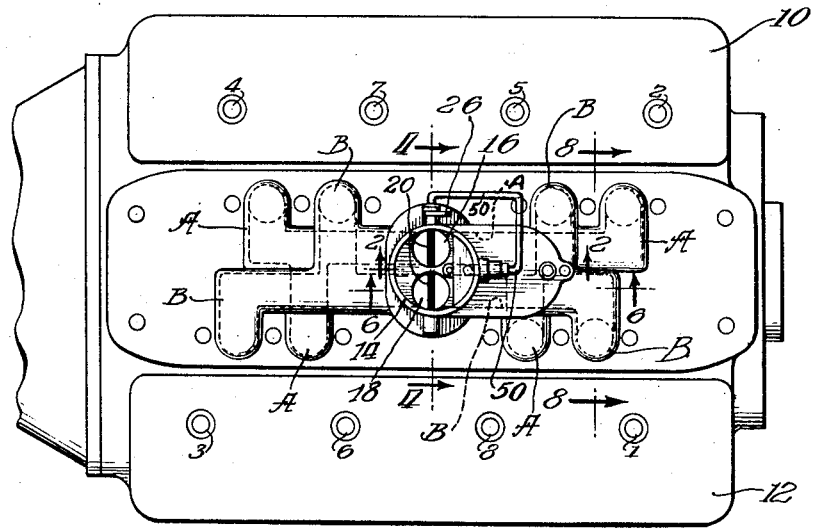

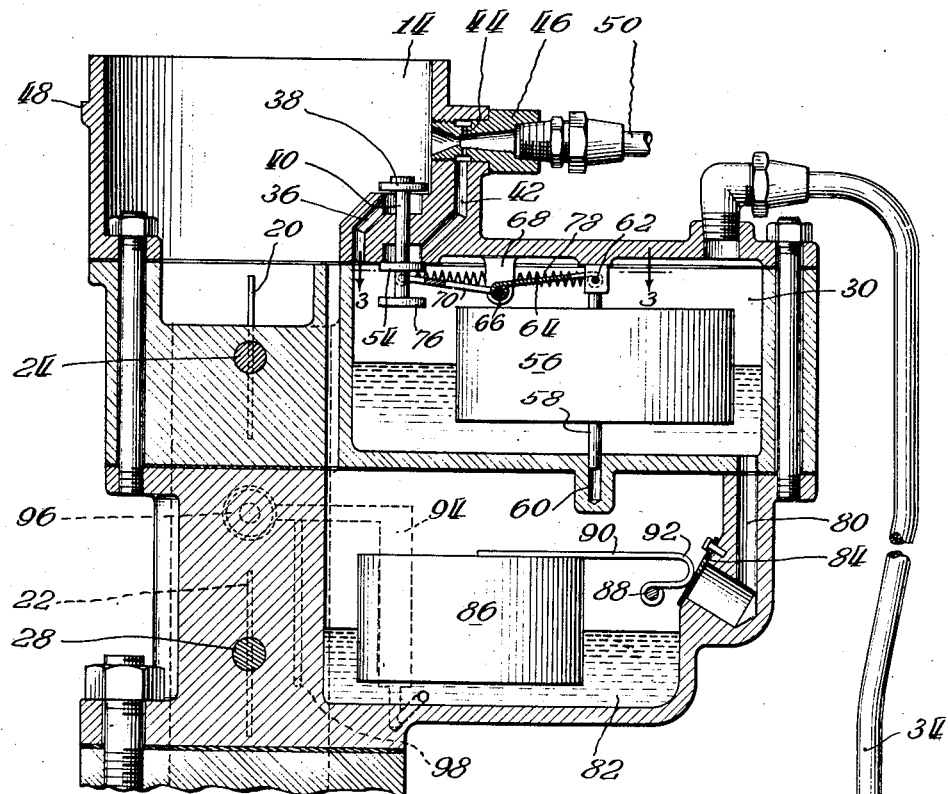

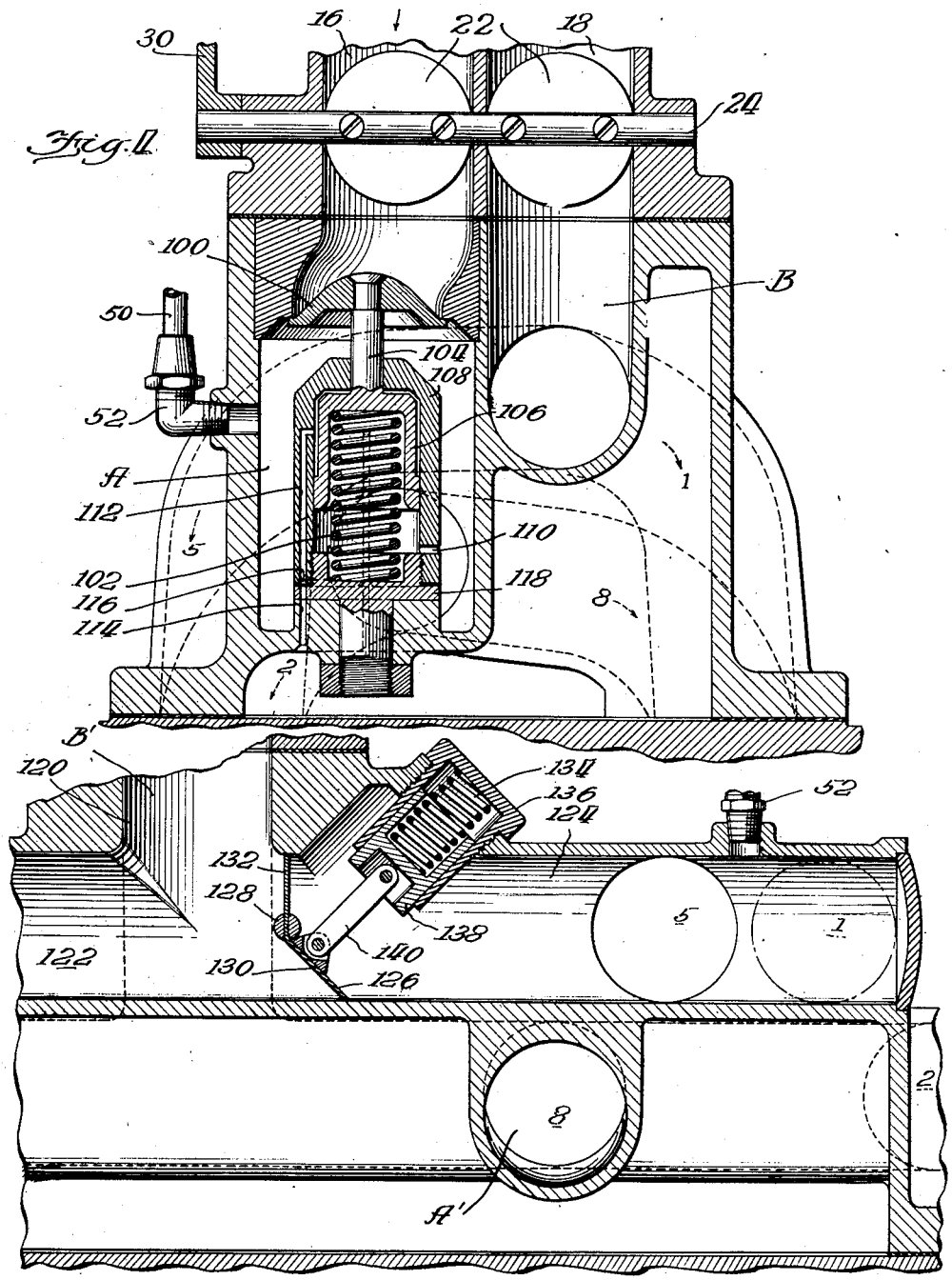

Patented Sept. 27, 1938

2,131,036

UNITED STATES PATENT OFFICE 2,131,036

FUEL FEEDING SYSTEM

Robert F. Bracke, Chicago, Ill.

Application March 21, 1935, Serial No. 12,156

13 Claims. (Cl. 123—198)

My invention relates to fuel-feeding systems and is particularly concerned with a fuel-feeding system for internal combustion engines.

The suction existing in the intake manifold of an internal combustion engine is commonly used as a means for sucking fuel from the main fuel tank which is usually located at a level lower than the intake manifold of the engine. The suction existing in the intake manifold of an engine varies with the operating conditions of the engine and when an automobile engine is operating under full throttle, there is insufficient suction in the intake manifold to assure a sufficient supply of fuel for the engine. Numerous attempts have been made to overcome this lack of sufficient suction at full throttle but the attempts heretofore made have interfered to a great extent with the proper operation of the engine.

An object of my invention is to provide a fuel-feeding system which is operated by the suction existing in the intake manifold of the engine and which will assure a constant and adequate supply of fuel to the engine under all conditions of operation without materially decreasing the efficiency of the engine or otherwise interfering with its operation to an objectionable extent.

Another object is to provide a fuel-feeding system of this type which will be entirely automatic in operation.

Another object is to provide a fuel-feeding system of this type which will be economical to manufacture and which will be durable and trouble-free in use.

Other objects and advantages of my invention will become apparent as the description proceeds.

In the drawings,

Figure 1 is a top plan view of a V-type of eight-cylinder internal combustion engine to which my invention is applied;

Figure 2 is a vertical section through the carburetor of the engine shown in Figure 1 and is taken on the line 2—2 of Figure 1, this figure also diagrammatically indicating the fuel line which connects the carburetor with the main fuel tank of the automobile;

Figure 3 is a detail of the operating mechanism of the float controlled valve of Figure 2, and is taken on the line 3—3 of Figure 2;

Figure 4 is a vertical section through a part of the inlet manifold of the engine shown in Figure 1, the view of Figure 4 being taken on the line 4—4 of Figure 1 and showing particularly the operation and structure of the manifold suction control valve;

Figure 5 is a diagrammatic representation of the effect of the control valve of this first modification on the power developed by the several cylinders of the engine;

Figure 6 is a vertical section through a part of the intake manifold of an engine like that shown in Figure 1 to which a modified form of my invention has been applied, this Figure 6 being taken in a vertical plane at the location represented by the line 6—6 of Figure 1;

Figure 7 is a diagrammatic representation similar to Figure 5 but showing the effect of the modification of Figure 6 on the operation of the engine; and Figure 8 is a vertical section through a part of the manifold of an engine of the type shown in Figure 1 to which a third form of my invention has been applied, this figure being taken on a plane represented by the line 8—8 of Figure 1.

Referring to the first modification shown in Figures 1 to 5, inclusive, of the drawings, I have indicated in Figure 1 a V-8 engine having cylinder blocks 10 and 12, each containing four cylinders. The eight cylinders are represented by numbers which indicate the firing order of the several cylinders. The engine is provided with a carburetor, as shown most clearly in Figure 2, having an air horn 14 leading to a pair of bores 16 and 18, each of which is provided with a choke valve 20 and a throttle valve 22. The two choke valves 20 are mounted on a common shaft 24 which may be rotated by the usual linkage 26, and the two throttle valves 22 are similarly mounted on a common shaft 28 provided with an arm 30 by means of which the throttle valves can be operated through the usual control mechanisms.

The carburetor also includes a suction chamber 30 which is connected to the main fuel tank 32 through piping 34. The fuel tank 32 is usually disposed at the rear of the automobile and is lower than the carburetor of the engine so that some force must be available to lift the fuel from the tank 32 to the carburetor of the engine.

The suction chamber 30 is provided with a duct 36 which connects the suction chamber with the interior of the air horn 14, the upper end of this duct being controlled by a valve 38 carried by a valve stem 40 which is reciprocably mounted in a suitable part of the carburetor intermediate the air horn and the suction chamber. A second duct 42 serves to connect the suction chamber 30 with radial passages 44 leading to the throat of a Venturi tube 46 which receives its supply of air from the interior of the air horn 14. The air horn 14 is provided with a shoulder 48 to facilitate the attachment of the usual air cleaner and silencer.

The Venturi tube 46 is connected to one end of a pipe 50 leading to an elbow 52 threaded into a wall of the inlet manifold and communicating with a specified portion of the interior of this manifold, as will presently be described. For the present, it will suffice to note that the part of the inlet manifold with which the pipe 50 communicates serves to draw air from the air horn 14 through the Venturi tube 46, and that this Venturi tube functions as a suction multiplier or booster to create a suction in the suction chamber 30 approximately three times as great as that existing in the part of the intake manifold with which the pipe 50 communicates.

A second valve 54, also mounted on the stem 40, controls communication between the suction chamber 30 and the suction duct 42. The two valves 38 and 54 are so mounted and controlled that when one is open the other is closed. These valves are controlled by a float 56 which is provided with a guide stem 58 having its lower end slidably received in a bore 60 formed in the bottom wall of the suction chamber 30. The upper end of the stem 58 is enlarged and carries a transverse pin 62 which is pivotally received in the bent-over fingers provided at one end of a plate 64. The other end of the plate 64 is wrapped around and pivoted on a stationary pin 66 carried by lugs 68 integral with the top of the suction chamber 30.

A second plate 70 has one end pivotally supported on the pin 66 and has its other ends provided with a pair of shorter pins 72. This latter end of the plate 70 is provided with a notch 74 in which the lower end of the valve stem 40 is located, the extreme lower end of the valve stem 40 being provided with a head 76 which prevents the notched end of the plate 70 from moving beyond the lower end of the valve stem 40.

Springs 78 connect the ends of pin 62 with the exposed ends of pins 72 whereby pins 62, 66 and 72 and plates 64 and 70 constitute a snap-over switch for shifting the valve stem 40 and valves 38 and 54 under the influence of the float 56. As shown in Figure 2, float 56 and valve stem 40 are both elevated. In this position of the valve stem, the valve 38 is open to admit atmospheric air to the interior of the suction chamber 30, and valve 54 is closed to cut off this suction chamber from the duct 42 leading to the throat of the Venturi tube 46.

In this position of the float 56 the fuel in chamber 30 can flow by gravity through passage 80 into fuel chamber 82. Communication between passage 80 and fuel chamber 82 is controlled by a flap valve 84 which may be of leather or other suitable material. This flap valve 84 is so positioned that it tends to close under the influence of gravity, and this valve is further so designed that the creation of a suction in the suction chamber 30 will likewise tend to close this valve so that fuel or air cannot be drawn from fuel chamber 82 into suction chamber 30. A second float 86 is located in fuel chamber 82. The float 86 is pivotally mounted on a pin 88 by means of a strip 90 having a bend 92 which holds valve 84 in closed position when fuel chamber 82 is full.

A pair of conduits 94 connect fuel chamber 82 with a pair of fuel-feeding nozzles or jets 96, one of which is located in each of the bores 16 and 18 intermediate the choke valve and throttle valve of its bore. Each bore is also provided with an idling jet 98 located below the corresponding throttle valve 22. The high-speed nozzles 96 and idling jets 98 may be of any well-known construction.

The bore 16 supplies a combustible mixture to a branch A of the intake manifold which connects with the cylinders indicated by the numbers 2, 8, 6 and 4, whereas the bore 18 supplies a combustible mixture to that part B of the intake manifold which connects with the remaining cylinders 1, 5, 7 and 3. At the point where the bore 16 connects with the branch A, I locate a suction valve 100 which is urged against its seat by a spring 102. The elbow 52 and pipe 50 connect Venturi tube 46 with manifold branch A immediately below the valve 100, and the purpose of this valve is to insure at all times sufficient suction in manifold branch A to draw fuel from the main fuel tank 32 to the suction chamber 30 of the carburetor.

When the engine is operating at full throttle, the valve 100 maintains a pressure differential between the bore 16 and manifold branch A which reduces to a slight extent the quantity of fuel supplied to the cylinders connected with this manifold branch, and to the same extent reduces the maximum compression obtainable in these cylinders. It is to be noted that no similar valve is interposed between bore 18 and its manifold branch B so that the cylinders connected with branch B receive their full supply of combustible mixture and operate at maximum compression. The result is that at least half of the engine is always operating at maximum efficiency and only half of the engine is at any time adversely affected by the valve 100. Furthermore, the arrangement of the manifold branches is such that the cylinders affected by the valve 100 alternate in firing order with the cylinders which are not so affected, so that even when the valve 100 is effective, the engine operates evenly. This operation is best shown in Figure 5 wherein the reduced power of the cylinders affected by the valve 100 are indicated by short lines which alternate with the longer lines representing the cylinders not so affected.

In order to further reduce the effect of the valve 100 on the operation of the engine, I have provided means for automatically rendering this valve ineffective when the normal operation of the engine produces sufficient vacuum in manifold branch A to raise fuel from the main tank 32 to the suction chamber 30 of the carburetor. This means is best shown in Figure 4 wherein the valve 100 is indicated as having a stem 104 terminating in a piston 106 located in a cylinder 108 which also functions as a guide for the valve. The side of the piston 106 which is acted upon by the spring 102 is in communication with the interior of manifold branch A through a port 110 suitably located in the cylinder wall. The other side of the piston 106 is in communication with the engine crank case through ducts 112 and 114 and annular groove 116 which serves to connect these ducts for any position of the cylinder 108 with respect to its base 118.

In present automotive practice the crank-case of the engine is provided with a ventilator or breather which maintains the crank-case under substantially atmospheric pressure so that the upper side of the piston 106 may be considered as acted upon by atmospheric pressure.

The operation of this form of my invention is as follows: The suction strokes of the pistons in the engine cylinders draw air into the air horn 14 of the carburetor, from whence it flows downwardly through the bores 16 and 18 and into manifold branches A and B, and thence to the engine cylinders. As the air passes through the bores 16 and 18, it is mixed with the desired amounts of fuel supplied by nozzles 96 and idling jets 98. When the engine is idling or operating at part throttle, the restriction formed by the throttle valve 22 in the bore 16 creates sufficient suction on the engine side of this throttle valve to operate the fuel-feeding mechanism, and under these conditions the valve 100 is held open against the tension of its spring 102 by the suction created beneath the piston 106 so that this valve 100 does not restrict the admission of a combustible mixture to the cylinders supplied from manifold branch A. All cylinders of the engine therefore produce equal power impulses.

However, when the engine is operating at full throttle or substantially full throttle, the valve 100 functions to maintain sufficient suction in the manifold branch A to operate the fuel-feeding mechanism. The spring 102 is made only strong enough to create sufficient pressure differential on opposite sides of the valve 100 to insure the requisite degree of vacuum in manifold branch A when the upper surface of valve 100 is exposed to atmospheric pressure. When the valve 100 is functioning to create additional suction in the manifold branch A, the flow of combustible mixture to the cylinders supplied by this branch A, is slightly restricted so that these cylinders develop slightly less power than do the cylinders suplied by manifold branch B.

The difference in power developed under these conditions between the cylinders supplied by manifold branch A and those supplied by manifold branch B is diagrammatically illustrated in Figure 5. For the sake of clearness, this figure greatly exaggerates the differences in power developed by the restricted cylinders, as compared with the unrestricted cylinders. Because of the multiplying effect of the Venturi tube 46, it is necessary to maintain in the manifold branch A a degree of suction which is only slightly below atmospheric pressure, and therefore the restricting effect of the valve 100 is but small even when this valve is operating with maximum effect.

An important feature of this form of my invention lies in the fact that the valve 100 does not restrict the flow of combustible mixture to all of the cylinders. Instead, the deleterious effects of this valve are limited to only half of the cylinders, and these cylinders alternate in firing with the unrestricted cylinders so that the engine runs substantially evenly and without noticeable variation in rotative speed under all conditions of operation.

The subatmospheric pressure maintained at all times in manifold branch A acts through elbow 52 and pipe 50 to draw air into and through the Venturi tube or booster 46, thereby creating a comparatively high degree of suction in the duct 42. It is to be noted that the terminal 52 of the pipe 50 is so located that air which enters manifold branch A therethrough mixes evenly with the combustible mixture supplied through bore 16 and equally affects all of the four cylinders supplied by manifold branch A.

When the level of the fuel in suction chamber 30 drops, the float 56 drops with it and opens the valve to connect this chamber 30 with the duct 42. This results in the creation of sufficient suction in the chamber 30 to draw fuel from the main fuel tank 32 until the inflow of fuel raises float 56 and closes valve 54, thus cutting off communication between the chamber and the suction duct 42.

Valve 38 opens simultaneously with the closure of valve 54 and connects the suction chamber 30 with atmosphere. The fuel in chamber 30 thereupon is free to flow by gravity through passage 80 and valve 84 into fuel chamber 82 until float 86 is raised sufficiently to hold the valve 84 closed against the gravity head of the fuel in chamber 30. The chambers 30 and 82 may be made relatively small in view of the fact that there is always sufficient suction available to draw additional fuel from the main tank 32.

The fuel in the fuel chamber 82 flows to the nozzles 96 and idling jets 98 which mix this fuel with the air entering the air horn 14 and passing downwardly through the bores 16 and 18. Upon leaving the bores 16 and 18, the combustible mixture thus formed flows through manifold branches A and B to the engine cylinders.

In the form of my invention which I have just described, the effects of the suction-creating valve in the manifold were limited to half of the engine cylinders, whereas in the form of my invention shown in Figures 6 and 7, the effects of the suction-creating valve are further restricted, being limited to only two of the eight engine cylinders. In this form of my invention, it is to be understood that the manifold branch A', which corresponds to the manifold branch A of the previous embodiment, is not provided with any suction-restricting valve whatsoever. The manifold branch B' has a vertical portion 120 leading downwardly from one of the carburetor bores and dividing to form horizontal subdivisions 122 and 124. Each of these subdivisions supplies two engine cylinders. The subdivision 122 is open and provides unrestricted flow of combustible mixture from the point where it communicates with the vertical portion 120 to the cylinders which it supplies. The inlet to the subdivision 124, on the other hand, is restricted by a suction creating valve 126 which is in the form of a bent plate of sheet metal carried by a pivotally-mounted shaft 128 suitably supported in the walls of the manifold.

The manifold subdivision 124 supplies combustible mixture to the cylinders indicated by the numerals 1 and 5 in Figure 1 of the drawings. In Figure 6, the port leading to cylinder 1 is shown in phantom outline because this port extends away from the direction in which the view of Figure 6 is taken. The pistons in these cylinders 1 and 5 create a suction in subdivision 124 which tends to rotate valve 126 about its pivot because of the larger area of the inclined portion 130 of the valve, as compared with its vertical portion 132.

A light spring 134, located in a cylinder 136, acts on a piston 138 in such a direction as to oppose opening of the valve 126, the piston being connected to the valve by a link 140. The piston 138 and cylinder 136 form a dashpot which tends to prevent rapid opening and closing of the valve 126 so that, when the engine is operating at medium or high speed, the valve 126 never closes completely between suction strokes of the cylinders 1 and 5. Instead, the valve 126 tends to assume and maintain a partly open position which is different for each of the higher engine speeds.

In this form of my invention there is no means for rendering the valve 126 inoperative when the normal operation of the engine is such as to produce the necessary degree of vacuum in the manifold subdivision 124, and therefore the valve 126 always maintains the manifold subdivision 124 at a pressure lower than that existing in the rest of manifold branch B' by an amount determined by the spring 134. This amount is of such an order that, when the rest of manifold branch B' is operating at substantially atmospheric pressure, there will be sufficient suction in subdivision 124 to operate the fuel-feeding mechanism.

The threaded terminal 52 of pipe 50 serves to connect the subdivision 124 with the Venturi tube 46, which multiplies the suction existing in the subdivision 124 sufficiently to operate the fuel-feeding mechanism shown in Figure 2. The terminal 52 is so located that the air supplied by it is equally divided between the cylinders 1 and 5 and has an opportunity to mix thoroughly with the combustible mixture flowing to those cylinders.

The restricting effect of the suction valve 126 on the cylinders 1 and 5 is diagrammatically illustrated to an exaggerated extent in Figure 7. It is important to note that the valve 126 is so located that it affects the first and fifth cylinders in order of firing so that three unrestricted cylinders fire between each two successive firings of the restricted cylinders. This promotes smoothness of engine operation and avoids any noticeable loping on the part of the engine.

In Figure 8 I have shown a further modification of my invention in which the suction valve restricts the supply of combustible mixture to only a single one of the eight cylinders of the engine. In this form of my invention, the manifold branch A'', which corresponds to the manifold A of Figure 1, is entirely unrestricted. Likewise, the manifold branch B'', corresponding to the manifold branch B of Figure 1, is unrestricted except immediately adjacent the point where this manifold branch communicates with the port 142 formed in the engine block 144 and leading directly to the inlet valve of cylinder 1.

Adjacent the port 142 the manifold branch B'' is provided with a valve seat 146 and a suction-creating valve 148 urged against its seat 146 by a light spring 150 which acts on a piston 152 attached to the upper end of valve stem 154. The piston 152 is located in a cylinder 156. This piston and cylinder function as a dashpot tending to retard the opening and closing movements of valve 148 so that at high engine speeds this valve remains open instead of opening and closing with each suction stroke of the cylinder 1.

Immediately beneath the valve 148 is a suction chamber 158 into which projects a tube 160 in open communication with the terminal 52 of the pipe 50 leading to the multiplying Venturi tube or booster 46. The tube 160 discharges the air drawn in through the booster 46 at a point adjacent the axial center of the chamber 158 so that this air is evenly mixed with the combustible mixture supplied to cylinder 1 through manifold branch B''.

The operation of that embodiment of my invention shown in Figure 8 is substantially the same as that shown in Figures 6 and 7 except that the valve of Figure 8 affects only a single one of the eight engine cylinders, whereas the valve of Figure 6 affects two of the engine cylinders.

The invention described herein was primarily designed for use in connection with fuel supply means, but it is to be understood that my invention is not necessarily limited to such means. My novel suction maintaining means may be utilized for the purpose of maintaining sufficient suction to operate wind-shield wipers, ignition control apparatus, vacuum cleaners, cigar lighters, priming devices, and motors for applying brakes, operating clutches or gear shifts or for other similar uses.

While I have described only three embodiments of my invention, it is to be understood that my invention may assume numerous forms and that the scope of my invention is to be limited solely by the following claims.

I claim:

1. In a fuel-feeding system for an internal combustion engine having a given number of cylinders, the combination of an intake manifold for supplying a combustible mixture to all of said cylinders, a carburetor for creating said mixture, said carburetor communicating with said manifold, a valve located in said manifold to maintain a predetermined degree of suction in a part of said manifold supplying less than the total number of said cylinders, said valve restricting the flow of combustible mixture to the cylinders supplied by said part of the manifold, the cylinders so restricted alternating in order of firing with the cylinders not so restricted, and suction-operated fuel-supply means communicating with said part of the manifold.

2. In a fuel-feeding system for an internal combustion engine having a given number of cylinders, the combination of an intake manifold for supplying a combustible mixture to all of said cylinders, a carburetor connected to and communicating with said manifold, a valve for restricting the flow of combustible mixture produced by said carburetor to a part of said manifold supplying half of said cylinders, the restricted cylinders alternating in order of firing with cylinders not so restricted, and fuel-supply means for said carburetor operated by the suction maintained in said part of the manifold.

3. Fuel-feeding mechanisms for internal combustion engines, comprising the combination of a carburetor having a throttle valve, an intake manifold connecting said carburetor with said cylinders, a flow-restricting valve for insuring the maintenance of a predetermined minimum suction in said manifold, means for rendering said last-mentioned valve ineffective when said minimum suction results from the normal operation of the engine, and fuel-supply means operated by the suction so maintained.

4. In a fuel-feeding system for internal combustion engines, the combination of a carburetor having a throttle valve, a manifold connecting said carburetor with the engine, a valve for maintaining a predetermined minimum suction in said manifold at all times, said valve being opened by the suction created by the cylinders of the engine, means for closing said valve, and a dashpot for holding said valve open continuously at higher engine speeds.

5. In fuel-feeding mechanism for internal combustion engines, the combination of a carburetor having throttle valve means, a manifold connecting said carburetor with the engine cylinders, said manifold having two main branches, each supplying some of the engine cylinders, a suction maintaining valve in only one of said manifold branches, and fuel-supply means operated by the suction maintained by said suction valve.

6. In fuel-feeding mechanism of the class described, the combination of a V-type internal combustion engine having a plurality of cylinders, carburetor means for supplying a combustible mixture to said cylinders, manifold means connecting said carburetor means with the cylinders of said engine, a suction-maintaining valve in said manifold restricting the flow of fuel to part of said cylinders only, the cylinders so restricted being divided between both cylinder banks of the V-type engine, and fuel-supply means for said carburetor operated by the suction maintained by said valve.

7. In mechanism of the class described, the combination of an eight-cylinder engine, a carburetor therefor, a manifold connecting said carburetor with said cylinders, a suction-maintaining valve in said manifold, said valve restricting flow of fuel to only two of the eight engine cylinders, and fuel-supply mechanism operated by the suction maintained by said valve.

8. In mechanism of the class described, the combination of an eight-cylinder engine, a carburetor therefor, a manifold connecting said carburetor with the cylinders of said engine, a suction maintaining valve in said manifold, said valve restricting flow of fuel to one only of said cylinders, and fuel-supply means for said carburetor operated by the suction maintained by said valve.

9. In mechanism of the class described, the combination of a multiple cylinder engine, carburetor means therefor, manifold means connecting said carburetor means with said cylinders, a suction maintaining valve in said manifold, said valve restricting the flow of fuel to one only of said cylinders, and fuel-supply means for said carburetor operated by the suction so maintained.

10. In fuel-feeding mechanism of the class described, the combination of an internal combustion engine, a carburetor therefor, a manifold connecting said carburetor with the cylinders of said engine, a suction maintaining valve in said manifold, a spring for closing said valve, a piston for opening said valve against the tension of said spring, means admitting atmospheric pressure to one side of said piston, means establishing communication between the other side of said piston and the engine side of said valve, and fuel-supply means for said carburetor operated by the suction maintained on the engine side of said valve.

11. In mechanism of the class described, the combination of an internal combustion engine having a plurality of cylinders, a carburetor for supplying a combustible mixture to said cylinders, a manifold connecting said carburetor with said cylinders, said manifold having two main branches and each branch being further subdivided, a suction creating valve restricting flow of fuel to only one subdivision of one manifold branch, and fuel-supply means for said carburetor operated by the suction maintained by said valve.

12. In mechanism of the class described, the combination of an engine having a plurality of cylinder blocks, cylinders in each block, an intake manifold for supplying combustible mixture to said cylinders, a suction-maintaining valve in said manifold, said valve restricting flow of said combustible mixture to a part only of the cylinders in each block, and fuel-supply means operated by the vacuum maintained by said valve.

13. Mechanism for internal combustion engines of the class described, comprising the combination of a carburetor having a throttle valve, an intake manifold connecting said carburetor with the cylinders of said engine, a flow-restricting valve for insuring the maintenance of a predetermined minimum suction in said manifold, means for rendering said last-mentioned valve ineffective when said minimum suction results from the normal operation of the engine, and means operated by the suction so maintained.

ROBERT F. BRACKE.